United States Patent [19]

Szarka

[11] Patent Number: 4,871,809

[45] Date of Patent: Oct. 3, 1989

[54] RAILROAD FLANGEWAY FILLER AND EXPANSION JOINT SEALER

[75] Inventor: Paul J. Szarka, Livonia, Mich.

[73] Assignee: Szarka Enterprises, Inc., Livonia, Mich.

[21] Appl. No.: 923,195

[22] Filed: Oct. 27, 1986

[51] Int. Cl.$^4$ .......................... C08L 7/00; C08L 9/00; C08L 75/04; E01B 25/28

[52] U.S. Cl. ..................... 525/131; 521/42; 521/45.5; 525/123; 238/2; 238/8

[58] Field of Search ................. 525/131, 123; 521/42, 521/45.5; 238/2, 8, 127

[56] References Cited

U.S. PATENT DOCUMENTS

| | | | |
|---|---|---|---|
| 2,471,043 | 5/1949 | Schenck | 521/45.5 |
| 3,663,469 | 5/1972 | Weissmahr | 521/42 |
| 3,801,421 | 4/1974 | Allen et al. | 521/42 |
| 4,038,239 | 7/1977 | Coyner et al. | 521/42 |
| 4,332,700 | 6/1982 | Munih | 521/45.5 |

*Primary Examiner*—Allan M. Lieberman
*Attorney, Agent, or Firm*—Harness, Dickey, Pierce

[57] ABSTRACT

A flangeway filler and sealing composition suitable for use in a flangeway or expansion joint in a railroad crossing of a roadway surface prepared by the steps of (i) placing cryogenically granulated elastomeric particles in a suitable container; (ii) adding a polyurethane resin to said cryogenically granulated elastomeric particles; (iii) mixing the cryogenically granulated elastomeric particles and the polyurethane resin. The cryogenically granulated elastomeric particles have an average particle size of less than about 3 mm, and the ratio of the cryogenically granulated elastomeric particles to the polyurethane resin is greater than 6 to 1 by weight.

9 Claims, No Drawings

RAILROAD FLANGEWAY FILLER AND EXPANSION JOINT SEALER

BACKGROUND AND SUMMARY OF THE INVENTION

The present invention relates to an elastomer compound which is particularly useful as a filler/sealer composition in flangeway openings between rails and panels in a railroad crossing. More specifically, the present invention relates to a flangeway filler and an expansion joint sealer composition based on a mixture of polyurethane binder resin and granulated elastomeric particles which meets or exceeds all known requirements for this type of product.

It has been a goal of railroad crossings constructed in the past to provide a durable, inexpensive and easy-to-install vehicular supporting deck for a railroad grade crossing which provides a smooth transgression of a vehicle along a roadway surface which intersects with a railroad track. An example of such crossing is set forth in Szarka U.S. Pat. Nos. 3,955,761 and 3,863,840. A further goal of prior art railroad crossings is to provide a level surface for pedestrian and small wheeled vehicular traffic which will allow safe and smooth transgression by pedestrians and vehicles in crossing a railroad crossing.

One of the major problems in any railroad crossing is the necessity of a space or flangeway opening which is left in every crossing for allowing a railroad wheel to pass through the crossing without incident. The necessity of the existence of the flangeway openings in railroad crossings creates several disadvantages in the construction of railroad crossings and in addition, creates bumpy road conditions for pedestrians and vehicular traffic crossing the intersection. For instance, the empty space may allow the panels used in constructing these crossings to shift. This shifting of the panels creates a further bumpy surface and is undesirable. In addition, these flangeway openings create uneven surfaces for bicycles and pedestrian traffic.

Past compositions have failed in solving these problems in that the compositions have not been durable enough to be used in these crossings. They have not been structurally sound enough to prevent the miscomings illustrated above or they have been too expensive to be justified for use in railroad crossings, and in addition have created time-consuming applications in railroad crossings.

Flangeway filler materials used in the past include a cork composition, which is expensive and is also hard to apply in the field. Other materials include tar-like materials which do not have the structural integrity or resiliency which is advantageous in a flangeway filler compositon. In addition, compositions have been used which rapidly deteriorate when used in the rugged environment of a railroad crossing. These past compositions deteriorate leaving gaps or may pull out of the flangeway opening, both of which are undesirable characteristics.

According to the present invention there is provided an elastomer sealing composition prepared by the steps of placing cryogenically granulated elastomeric particles in a suitable containment means; adding a polyurethane resin to the cryogenically granulated elastomeric particles; and mechanically mixing the cryogenically granulated particles and the polyurethane resin.

The granulated elastomeric particles used in the present invention have an average particle size of less than about 3 mm. The ratio of the granulated elastomeric particles to the polyurethane resin, in the present invention is greater than 6 to 1 by weight.

It is a general object of the present invention to produce an elastomer sealing composition which is particularly suited for use in flangeway openings in a railroad crossing.

It is the more specific object of the present invention to produce an elastomer sealing composition which is durable, resilient, adhesive, and will retain its structural integrity.

It is a further object of the present invention to provide a simple process for making an elastomer sealer composition in the field, which is suitable for use in any type railroad crossing of the highest specifications.

A further object of the present invention is to provide an elastomer sealing composition which is durable enough to withstand continued depressions by railroad wheels passing over it and be resilient enough to bounce back from these depressions and in addition provide a material which provides a safe and smooth surface for vehicular, pedestrian, and small wheeled vehicular traffic (bicycles, etc.).

It is a further object of the present invention to provide an inexpensive, easy to apply, and superior quality elastomer sealing composition which will meet or exceed the most demanding specifications of even the most demanding installers of railroad crossings.

It is a further object of the present invention to provide an elastomer sealing composition which retains its structural integrity even without the benefit of the original molding walls and which will not disintegrate upon removal of the walls in which it was molded or under other conditions encountered in a railroad crossing application.

DETAILED DESCRIPTION OF PREFERRED EMBODIMENTS

In the present invention there is provided an elastomer sealing composition prepared by the steps of placing cryogenically granulated elastomeric particles in a suitable containing means; adding a polyurethane resin to the cryogenically granulated elastomer particles; and mechanically mixing the cryogenically granulated elastomeric particles and the polyurethane resin.

According to the present invention, the cryogenically granulated elastomeric particles have an average particle size of less than 3 mm and the ratio of the granulated elastomeric particles to the polyurethane resin is greater than 6 to 1 by weight.

The cryogenically granulated elastomeric particles used in the present invention comprise particulate elastomeric material. The elastomeric material of the present invention is preferably a rubber material and more preferably a natural rubber material selected from the group including steel belted passenger tires, tire peels, synthetic butyl rubber (SBR), natural rubber, nitrile, neoprene, EPDM, polybutadiene or flourel elastomers.

The size of cryogenically granulated rubber particles is preferably in the range of about 0.01 mm to about 3 mm in cross sectional diameter. In a preferred embodiment of the present invention, an average particle size of between about 0.5 and 1.5 mm in cross sectional diameter is highly preferred for producing a suitable composition with highly preferred durability, resiliency and quicksetting characteristics.

The cryogenically granulated particles of the present invention include elastomeric particles taken from recycled steel belted radial tires which have been ground up by a cryogenic process and then purified from impurities such as steel cord material and the like. The material can be obtained from Midwest Elastomers, Inc., 700 Industrial Drive, Wapakoneta, Ohio, or other suppliers.

The use of this material in the present invention provides for an advantageous cost while retaining superior workability and durability requirements when the material is put to its final use as a flangeway filler and an expansion joint sealer composition or more preferably when used as a flangeway opening filler composition.

The polyurethane resin used in the present invention is of the moisture curing polyurethane binder type. The binder used must produce a resilient durable and fast setting compound which will retain its molded shape without the benefit of the walls in which it is molded when mixed with the elastomeric material disclosed above. However, a preferred embodiment of the present invention uses a moisture curing polyurethane binder with the trade name E-Bond Z-75 FAB-RA-Binder. E-Bond Z-75 FAB-RA-Binder is produced by E-Bond Epoxies, Inc of 501 N.E. 33rd Street, Fort Lauderdale, Fla.

The ratio of elastomeric particles to polyurethane resin may be varied according to the properties which are desired in the product. Preferred ratios include ratios of from about 6.5:1 to about 14:1 by weight of cryogenically granulated elastomeric particles to polyurethane resin. Highly preferred ratio of from about 6.5:1 to 8:1 may be used in the present composition and provide a compound suitable for use as a flangeway opening filler composition.

In a preferred embodiment of the present invention, a ratio of about 7:1 of cryogenically granulated elastomeric particles to polyurethane resin. More specifically, a ratio of 14 parts by weight cryogenically granulated elastomeric particles to 1.7 parts by weight polyurethane resin is found to be optimal in the present invention.

The present invention also relates to an article of manufacture prepared by employing the compound produced in accordance with the steps disclosed above. More specifically, a flangeway space filler is provided which is manufactured by employing the composition prepared in accordance with the steps disclosed above. In addition, provided for is a method of preparation of a sealed flangeway opening in a railroad crossing by employing a composition prepared in accordance with the steps set forth above.

The compositions of the present invention are particularly suited for use in railroad crossings where flangeway openings which are the spaces between the railroad track and the roadway crossing panels, create a rough crossing which is undesirable. The composition designed as such must be resilient for allowing railroad wheels to indent the material while they pass over it, but preferably bounces back to its original shape such that the opening will be level for the smooth use by vehicular, bicycle and pedestrian traffic. In addition, the compound must be durable enough to withstand the brutal conditions encountered at a railroad crossing. While used as a filling compound for flangeway openings, the compound also acts to check any movement by the crossing panels toward the railroad track which is also undesirable.

The composition disclosed in the present invention is superior in meeting the above requirements. While the present invention is designed for use in flangeway openings in railroad crossings, the composition is also suitable for use as an expansion joint sealer compound or any other uses in which the above characteristics are desirable.

The example below is set forth for illustrative purposes for further describing the present invention and is not to be understood as limiting the invention in any way.

EXAMPLE 1

An elastomer sealing elastomer composition is prepared for use in filling a flangeway opening by:
(i) placing 17½ pounds of cryogenically ground rubber particles in the size range of from 0.5 to 1.5 mm in a metal container or portable mortar/contrete type mixer;
(ii) adding 34 ounces of E-Bond Z-75 FAB-RA-Binder to the particles in the container or mixer;
(iii) mixing thoroughly the contents of the container or mixer with a heavy duty hand drill having a mixing paddle attached to it;
(iv) pouring the mixture into a flangeway opening and leveling the compound to the level of the track; and
(v) allowing the compound to cure.

The invention set forth above has been described in an illustrative manner, and it is to be understood that the terminology used is intended to be words of description rather than limitation. Obviously, many modifications and variations of the present invention are possible in light of the above teachings. It is therefore, to be understood that within the scope of the appended claims, the invention may be practiced other than as specifically described.

What is claimed is:

1. A method of preparation of a filled flangeway opening of a railroad crossing comprising the steps of:
   A. Preparing a flangeway filler composition by:
      (i) placing cryogenically granulated elastomeric particles in a suitable containment means;
      (ii) adding a polyurethane moisture curable binder type resin to said cryogenically granulated elastomeric particles;
      (iii) mechanically mixing said cryogenically granulated elastomeric particles and said polyurethane resin;
      wherein said cryogenically granulated elastomeric particles have an average particle size of from about .01mm to about 3mm and the ratio of said cryogenically granulated elastomeric particles to said polyurethane resin is from about 6:1 by weight to about 14:1 by weight;
   B. Placing said flangeway filler composition in the flangeway space and substantially leveling said filler with the railroad crossing; and
   C. Allowing said composition to cure.

2. The method of claim 1 wherein the particle size of said cryogenically granulated elastomeric particles is from about 0.5 to about 1.5 mm in cross section and the ratio of said cryogenically granulated elastomeric particles to said moisture cured polyurethane resin is from about 6.5:1 to about 8:1 by weight.

3. The method according to claim 2 wherein said ratio is about 7:1.

4. The method according to claim 2 wherein said ratio is about 14:1.7.

5. A method of preparation of a filled for a flangeway opening in a railroad crossing comprising the steps of:
  A. Preparing an elastomeric flangeway sealer composition by:
    (i) placing cryogenically granulated elastomeric particles, prepared from steel belted radial stock, having a size range of from 0.5 to 1.5 mm in cross section in a suitable container;
    (ii) adding a polyurethane moisture curable binder type in a ratio of 14 parts by weight cryogenically granulated elastomeric particles to 1.7 parts by weight of said polyurethane resin;
    (iii) mechanically mixing said cryogenically granulated elastomeric particles and said polyurethane resin.
  B. Placing said composition into a flangeway opening and substantially leveling said composition in said opening; and
  C. Allowing said composition to cure in said opening.

6. A filled flangeway space prepared by the steps comprising:
  A. Preparing a flangeway filler composition by:
    (i) placing cryogenically granulated elastomeric particles in a suitable containment means;
    (ii) adding a polyurethane moisture curable binder type resin to said cryogenically granulated elastomeric particles;
    (iii) mechanically mixing said cryogenically granulated elastomeric particles and said polyurethane resin;
    wherein said cryogenically granulated elastomeric particles have an average particle size of from about .01mm to about 3mm and the ratio of said cryogenically granulated elastomeric particles to said polyurethane resin is from about 6:1 by weight to about 14:1 by weight;
  B. Placing said flangeway filler composition in the flangeway space and substantially leveling said filler with the railroad crossing; and
  C. Allowing said composition to cure.

7. A filled flangeway space in accordance with claim 6 wherein the particle size of said cryogenically granulated elastomeric particles is from about 0.5 to about 1.5 mm in cross section and the ratio of said cryogenically granulated elastomeric particles to said polyurethane moisture curable binder type resin is from about 6.5:1 to about 8:1 by weight.

8. A filled flangeway space in accordance with claim 7 wherein said ratio is about 7:1.

9. A filled flangeway space in accordance with claim 7 wherein said ratio is about 14:1.7.

* * * * *